Figure 1:
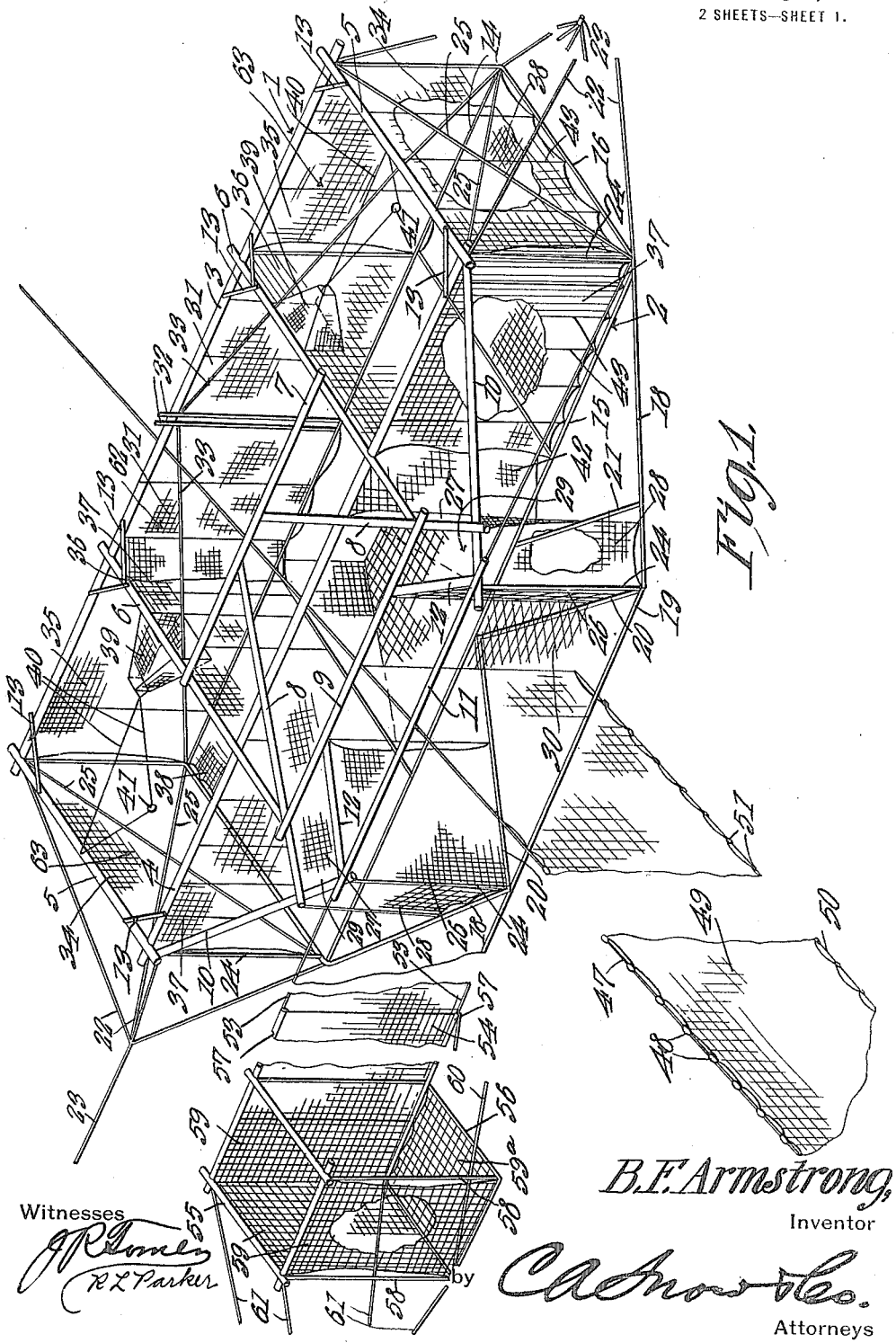

B. F. ARMSTRONG.
FLOATING FISH TRAP.
APPLICATION FILED MAR. 1, 1916.

1,193,216.

Patented Aug. 1, 1916.
2 SHEETS—SHEET 1.

B.F.Armstrong,
Inventor

Witnesses

Attorneys

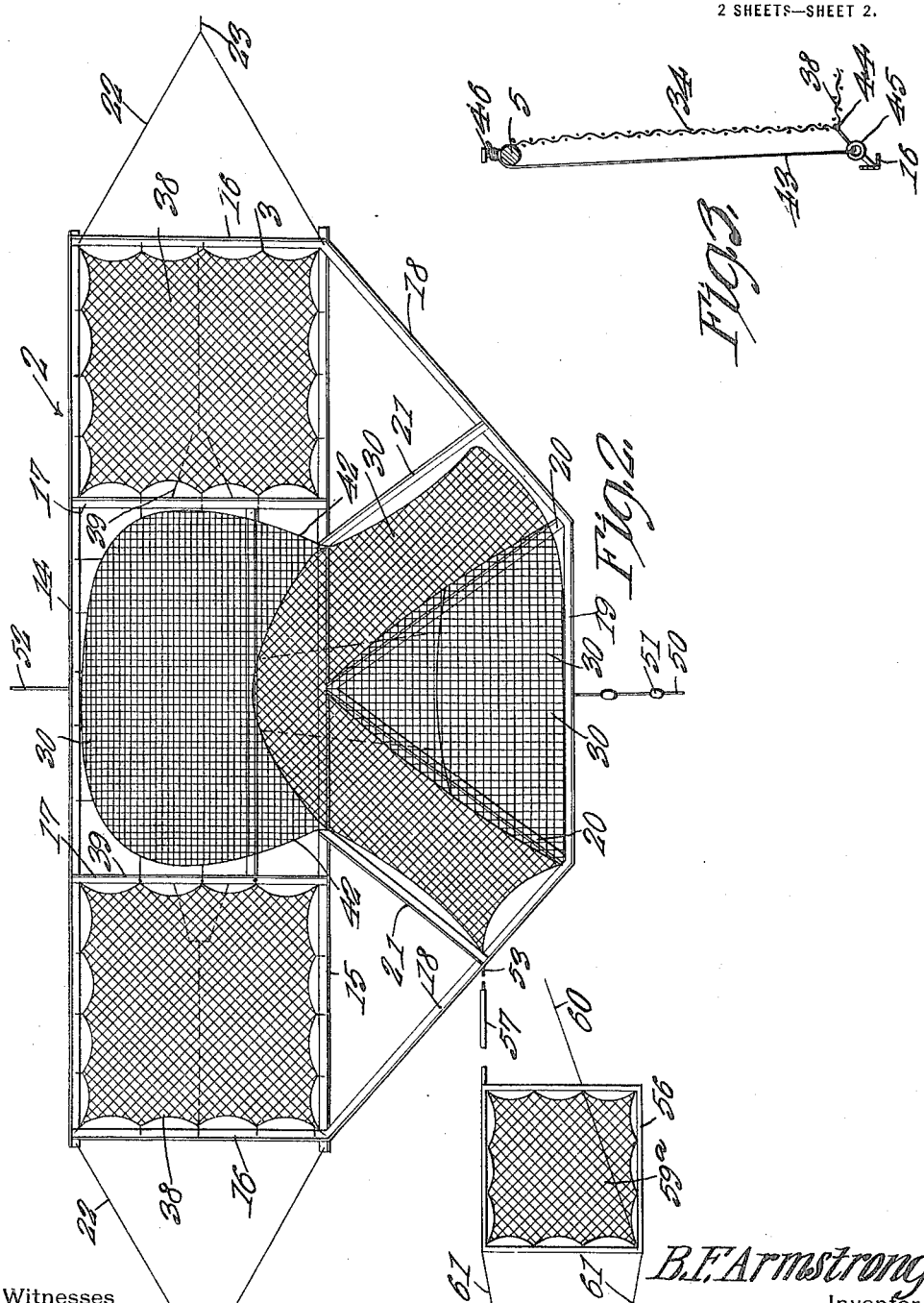

UNITED STATES PATENT OFFICE.

BENJAMIN F. ARMSTRONG, OF WESTPORT, WASHINGTON.

FLOATING FISH-TRAP.

1,193,216.

Specification of Letters Patent.

Patented Aug. 1, 1916.

Application filed March 1, 1916. Serial No. 81,455.

*To all whom it may concern:*

Be it known that I, BENJAMIN F. ARMSTRONG, a citizen of the United States, residing at Westport, in the county of Grays Harbor and State of Washington, have invented a new and useful Floating Fish-Trap, of which the following is a specification.

The present invention appertains to traps, and aims to provide a novel and improved floating fish trap.

It is the object of the invention to provide a floating fish trap which is not liable to be put out of order by currents, tides, and other disturbing water conditions, which can be used in deep or shallow water, which requires no piles for holding it in place, which can be readily towed from place to place, and the webs of which are not apt to be pressed out of position or to rise to the surface of the water.

The present trap has novel means for leading or directing the fish into the captivity chambers, from which the fish can be removed easily, and from which the fish cannot escape. The trap is also provided with means whereby an opening can be provided to let the fish out, thereby to render the trap inoperative on days when the catching of fish is prohibited by law.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a perspective view of the trap, portions being broken away. Fig. 2 is a bottom plan view of the trap. Fig. 3 is an enlarged vertical section taken on the line 3—3 of Fig. 2 to illustrate one of the cords connecting the upper and lower frames and webbing.

In carrying out the invention, there is provided upper and lower parallel frames 1 and 2, respectively, the upper frame 1 being constructed of wood or other buoyant material which floats upon the surface of the water, and the frame 2 being constructed of angle irons or other metallic stock so that it sinks within the water.

The upper frame 1 comprises a pair of longitudinal parallel poles or members 3 and 4, and cross bars 5 attached to the ends of the members 3—4. Intermediate cross bars 6 are secured to the members 3 and 4 and project beyond the member 4. A longitudinal bar 7 is secured upon the bars 6 between the members 3 and 4, and diverging bars 8 are secured to the bar 7, member 4, and projecting ends of the cross bars 6. A bar 9 is secured upon the bars 8 at the protruding ends of the bars 6, and converging bars 10 have their remote ends secured to the joints between the member 4 and end bars 5, and said bars 10 are secured to the projecting remote ends of the bars 8. A bar 11 parallel with the bar 9 and members 3—4 is secured to the adjacent ends of the bars 10, and diverging bars 12 are secured at their adjacent ends to the bar 9 and at their remote ends to the joints of the bars 10 and 11. The frame 1 is made rigid by braces 13 connecting the parts thereof at desired points, as evident by reference to Fig. 1.

The lower frame 2 is of the same outline as the upper frame, but is of slightly different construction. It embodies a pair of parallel longitudinal members 14 and 15 below and parallel with the respective members 3 and 4, and the ends of the members 14 and 15 are connected by cross bars 16 below and parallel with the bars 5. The members 14 and 15 are also connected by intermediate cross bars 17 below and parallel with the bars 6.

Converging bars 18 have their remote ends secured to the joints between the member 15 and bars 16 and are disposed below and parallel with the bars 10, and a bar 19 connects the adjacent ends of the bars 18 and is disposed below and parallel with the bar 11. Diverging bars 20 have their adjacent ends secured to the intermediate portion of the member 15 and have their remote ends secured to the joints of the bars 18 and 19, and diverging bars 21 have their adjacent ends attached to the member 15 near the bars 17 and have their remote ends attached to the bars 18. The bars 20 are disposed below and approximately parallel with the bars 12, and the bars 21 are disposed below and approximately parallel with the bars 8.

In order to hold the frames in the place in the river, lake, or other body of water, converging cords 22 are attached to the end corners of the upper and lower frames, and are connected to oppositely extending cables 23, one extending down stream, and the other extending up stream. The cables 23 are connected to suitable anchors, for preventing the up stream or down stream movement of the trap.

The various members of the upper and lower frames are connected at suitable points by vertical cords or flexible suspension elements 43, whereby the lower frame is suspended from the upper frame. The upper and lower frames are also connected at desired points with diagonal or oblique bracing cords or flexible elements 25, which tend to resist the shifting of the lower frame relative to the upper frame.

The upper and lower frames are provided with webs, which are preferably constructed of netting or cloth of suitable mesh, to render the webs transparent, and to allow the water to flow therethrough without imposing too much strain upon the trap. Diverging leader webs 26 have their upper edges attached to the bars 12 and diverging leader webs 27 have their upper edges attached to the bars 8, and the pockets 29 between said webs are closed at their outer ends by webs 28 attached to the outer ends of said webs 26—27 and also attached to the bars 10 between the bars 8 and 12. A bottom web 30 is attached to the lower frame 2 within the outline formed by the member 14, cross bars 17, bars 21, bars 18, and bar 19. Gate or closure webs 31 are disposed between the members 3 and 14 of the upper and lower frames, between the rear ends of the cross bars 6 and 17, and the adjacent ends of the webs 31 are attached to vertical bars 32 to which are connected diagonal cords 33 running from the upper ends of the bars 32 to the rear corners of the lower frame 2. The bars 32 can be held together by tying the same, or the like, whereby the webs 31 close the rear end of the entrance chamber 62. End webs 34 have their upper edges attached to the bars 5, rear webs 35 have their upper edges attached to the member 3 between the bars 5 and 6, intermediate webs 36 have their upper edges attached to the bars 6 between the members 3 and 4, and front webs 37 have their upper edges attached to the member 4 between the bars 5 and 6. Said webs 34, 35, 36 and 37 provide two captivity chambers 63 at the ends of the trap, the bottoms of which are closed by bottom webs 38 attached to the lower edges of the said webs 34, 35, 36 and 37. The webs 36 provide partitions between the entrance chamber 62 and captivity chambers 63. The partition webs 36 are provided with tapered or frusto-pyramidal leaders 39, preferably constructed of the same material as the webs, and projecting into the captivity chambers 63. Cords 40 connect the free ends of the leaders 39 and the end bars 5, and are preferably weighted, as at 41, to hold the leaders in proper position for the passage of the fish therethrough into the captivity chambers. The spaces between the webs 27 and webs 36 are closed by webs 42.

As a means for fastening the various webs to the lower frame, cords 43 are attached, as at 44, to the lower edges of the vertical webs, and are passed through eyes 45 attached to the members of the lower frame. The upper ends of the cords 43 are wrapped around or tied to pins 46 carried by the members of the upper frame, and this permits the cords to be adjusted whereby the weight of the lower frame will properly render the webs taut. The cords 43 can be used for drawing up the lower frame, to collapse the trap, in order that the trap can be readily towed from place to place.

The trap is preferably arranged parallel with the current, so that the flow of water is endwise of the trap, and an in shore lead extends from the mouth of the trap, which is between the leader webs 26, to the shore. This in shore lead embodies a cable or line 47 attached to the upper frame between the ends thereof, and extending to the shore, the cable 49 being attached to a suitable stake or other anchoring means. The cable 47 is provided with cork floats 48, so that the cable remains on the surface of the water, and a lead net 49 is suspended from the cable 47 and has attached to its lower edge a line 50 provided with lead weights 51, to hold the net 49 in submerged position, whereby it provides a barrier for the fish, so that the fish will swim along the net 49 toward the off shore end thereof in attempting to pass around the net.

An off shore cable 52 is secured to the upper frame between the ends thereof, and can be attached to a suitable anchor at the off shore side of the trap, for preventing the in shore movement of the trap, while the cable 47 prevents the off shore movement thereof. The trap is also provided with an off shore or down stream lead extending from the mouth of the trap. This down stream lead embodies upper and lower cables 53 attached to the upper and lower frames at the down stream ends of the bars 11 and 19, and a net 54 has its upper and lower edges attached to the cables 53. Attached to the free or down stream end of the cables 53 and net 54 are upper and lower rectangular frames 55 and 56, the upper one being buoyant, while the lower one is of metal. The frames 55 and 56 are provided with extensions 57 to which the cables 53 are connected, whereby to hold the frames in proper position relative to the net 54, and said frames 55 and 56 are connected by cords or cables 58, the same as the cables or cords 24 above described. Nets 59 are attached to the upper and lower frames 55 and 56, and provide a three sided chamber or pocket at the down stream end of the respective lead, said chamber having a bottom net 59ª attached to the lower frame 56. The lower frame 56 is connected by a diagonal cord 60 with the end of the lower extension 57, to brace the structure, and the frames 55 and 56 have attached thereto cords or cables 61 running to another cable, whereby the down stream lead is held in place.

The trap has the captivity chambers 63 at the ends thereof, and between which is arranged the entrance chamber 62 and the V-shaped leader embodying the webs 27 has its smaller end open and extending into the chamber 62. Another leader is disposed within the mouth of the leader 27, and comprises the webs 26, between which the off shore end of the net 49 is disposed. Thus, the fish in attempting to pass around the net 49, will pass to the off shore end thereof, and will thus be directed into the mouth of the trap, and will naturally pass on into the trap, being directed inwardly by the leader webs 26. Any fish in an attempt to turn back after passing the webs 26, will in passing around said webs, enter the pockets 29, from which they cannot escape, unless they turn back, and this will direct them toward the entrance opening between the rear or adjacent ends of the leader webs 27. The fish pass into the entrance chamber 62, from which they are not apt to pass back to the mouth of the trap, due to the divergent arrangement of the webs 27, and the reduced opening between the adjacent ends thereof. The fish can readily pass through the leaders 39 into the captivity chambers 63, from which they cannot escape, since they will not pass back through the leaders 29 due to the tapered form thereof. The fish can be taken from the chambers 63 in any suitable manner. The down stream lead has the office of directing the fish back toward the trap, when the fish pass down along the net 54, since the fish in entering the chamber or pocket at the end of the net 54, must turn around and move back, and this tends to direct them back along the net 54 to the mouth of the trap.

During the days or seasons when the catching of fish is prohibited by law, the bars 32 can be separated, thus to open the rear end of the chamber 62, the webs 31 being moved out of the way, which permits the fish which pass into the trap to readily pass out of the chamber 63, and thus no fish are caught.

By the provision of the cords 24, 25 and 43, the webs are held in place, in spite of the current, tide or the like, and there will be no liability of the webs being displaced or brought to the surface of the water, since the lower frame will be held in proper position below the upper floating frame.

The trap can be used in shallow and deep water, and requires no piles to hold it in place. The lower frame can be readily raised to collapse the trap in order that it can be towed from one place to another.

Having thus described the invention, what is claimed as new is:

1. A floating fish trap embodying a buoyant frame, a lower metallic frame, webs connecting said frames and providing end captivity chambers, an entrance chamber between the captivity chambers, a V-shaped leader having its smaller end open and projecting within the entrance chamber, certain webs providing partitions between the entrance and captivity chambers, said partition webs having leaders to enable the fish to pass from the entrance chamber into the captivity chambers, and other webs providing a closure for the entrance chamber opposite the first mentioned leader and adapted to be separated to let the fish escape from the entrance chamber.

2. A floating fish trap embodying an upper buoyant frame, a lower metallic frame, webs connecting the frames and providing an entrance leader and fish trapping means, an inshore lead extending from the mouth, and a down stream lead extending from the mouth and provided at its end with a three sided pocket including an upper buoyant frame, a lower metallic frame, and webs connecting them.

In testimony that I claim the foregoing as my own, I have hereto affixed my signature in the presence of two witnesses.

BENJAMIN F. ARMSTRONG.

Witnesses:
JOHN T. WELSH,
A. P. LEONARD.